US009279586B2

(12) United States Patent
Bulat

(10) Patent No.: US 9,279,586 B2
(45) Date of Patent: Mar. 8, 2016

(54) RESONATOR DEVICE FOR DAMPING THE PRESSURE OSCILLATION WITHIN A COMBUSTION CHAMBER AND A METHOD FOR OPERATING A COMBUSTION ARRANGEMENT

(75) Inventor: Ghenadie Bulat, Lincoln (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 713 days.

(21) Appl. No.: 13/640,340

(22) PCT Filed: Mar. 8, 2011

(86) PCT No.: PCT/EP2011/053426
§ 371 (c)(1),
(2), (4) Date: Oct. 10, 2012

(87) PCT Pub. No.: WO2011/128158
PCT Pub. Date: Oct. 20, 2011

(65) Prior Publication Data
US 2013/0025282 A1 Jan. 31, 2013

(30) Foreign Application Priority Data
Apr. 13, 2010 (EP) .................................. 10159747

(51) Int. Cl.
*F02C 7/24* (2006.01)
*F23R 3/00* (2006.01)
*F23M 20/00* (2014.01)

(52) U.S. Cl.
CPC . *F23R 3/002* (2013.01); *F02C 7/24* (2013.01); *F23M 20/005* (2015.01); *F05D 2260/963* (2013.01); *F23R 2900/00013* (2013.01); *F23R 2900/00014* (2013.01)

(58) Field of Classification Search
CPC .................. F23M 20/005; F23R 3/002; F23R 2900/00013; F23R 2900/00014; F02C 7/24; F02C 5/10; F05D 2260/963
USPC ..................................... 431/8, 14, 16, 19, 114
See application file for complete search history.

(56) References Cited

U.S. PATENT DOCUMENTS 5,189,266 A * 2/1993 Sasaki et al. .................. 181/227
5,222,448 A * 6/1993 Morgenthaler et al. ....... 110/346
(Continued)

FOREIGN PATENT DOCUMENTS

DE   102005052881 A1   5/2007
EA        006412 B1   12/2005
EP      0974788 A1    1/2000
(Continued)

*Primary Examiner* — Phutthiwat Wongwian
*Assistant Examiner* — Marc Amar

(57) ABSTRACT

A resonator device is provided for damping a pressure oscillation within a combustion chamber. The resonator device may comprise: a container filled with a gas; an opening in the container; and a heating element adapted to generate a flame. The flame is arranged to heat the gas within the container. The resonator device is comprised in a combustion arrangement comprising a combustion chamber for defining a combustion space for burning fuel. The container is connected to the combustion chamber such that an inside of the container is in communication with the combustion space via the opening. The resonator device has a resonance frequency equal to a pressure oscillation frequency within the combustion chamber under normal load conditions.

15 Claims, 3 Drawing Sheets

(56) References Cited

U.S. PATENT DOCUMENTS

| | | | |
|---|---|---|---|
| 5,257,500 A | * | 11/1993 | Venkataramani et al. .. 60/39.821 |
| 2006/0266637 A1 | * | 11/2006 | Gutsol et al. ................. 204/164 |
| 2008/0209884 A1 | * | 9/2008 | Denne ............................ 60/247 |

FOREIGN PATENT DOCUMENTS

| | | | | |
|---|---|---|---|---|
| EP | 1517087 A1 | | 3/2005 | |
| GB | 2288660 A | * | 10/1995 | ............. F23M 13/00 |
| WO | WO 2010018069 A1 | | 2/2010 | |

* cited by examiner

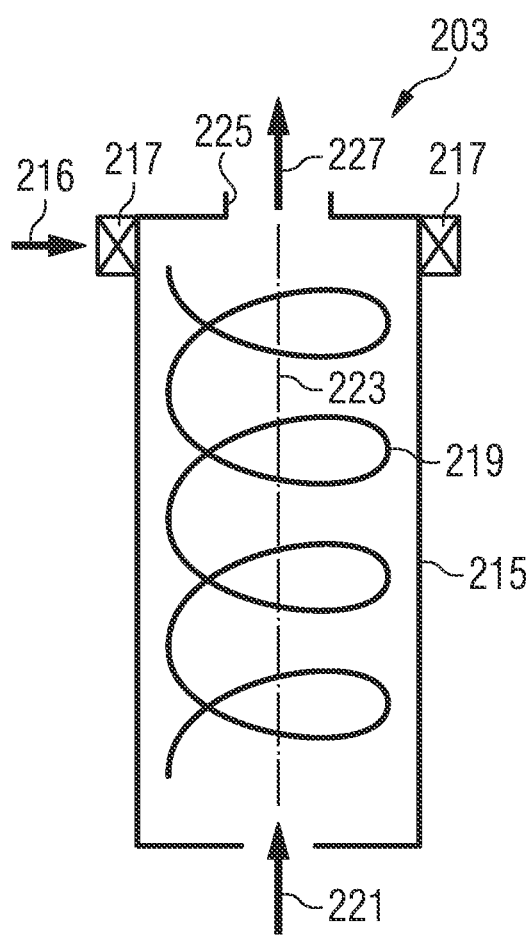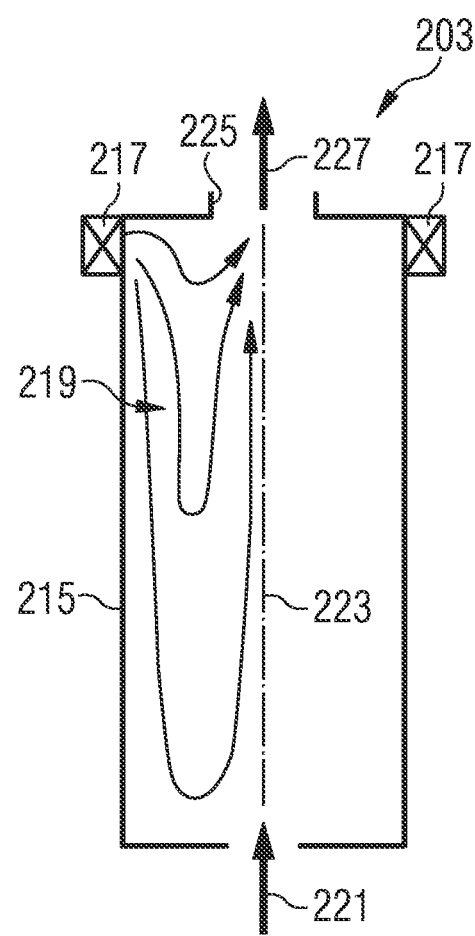

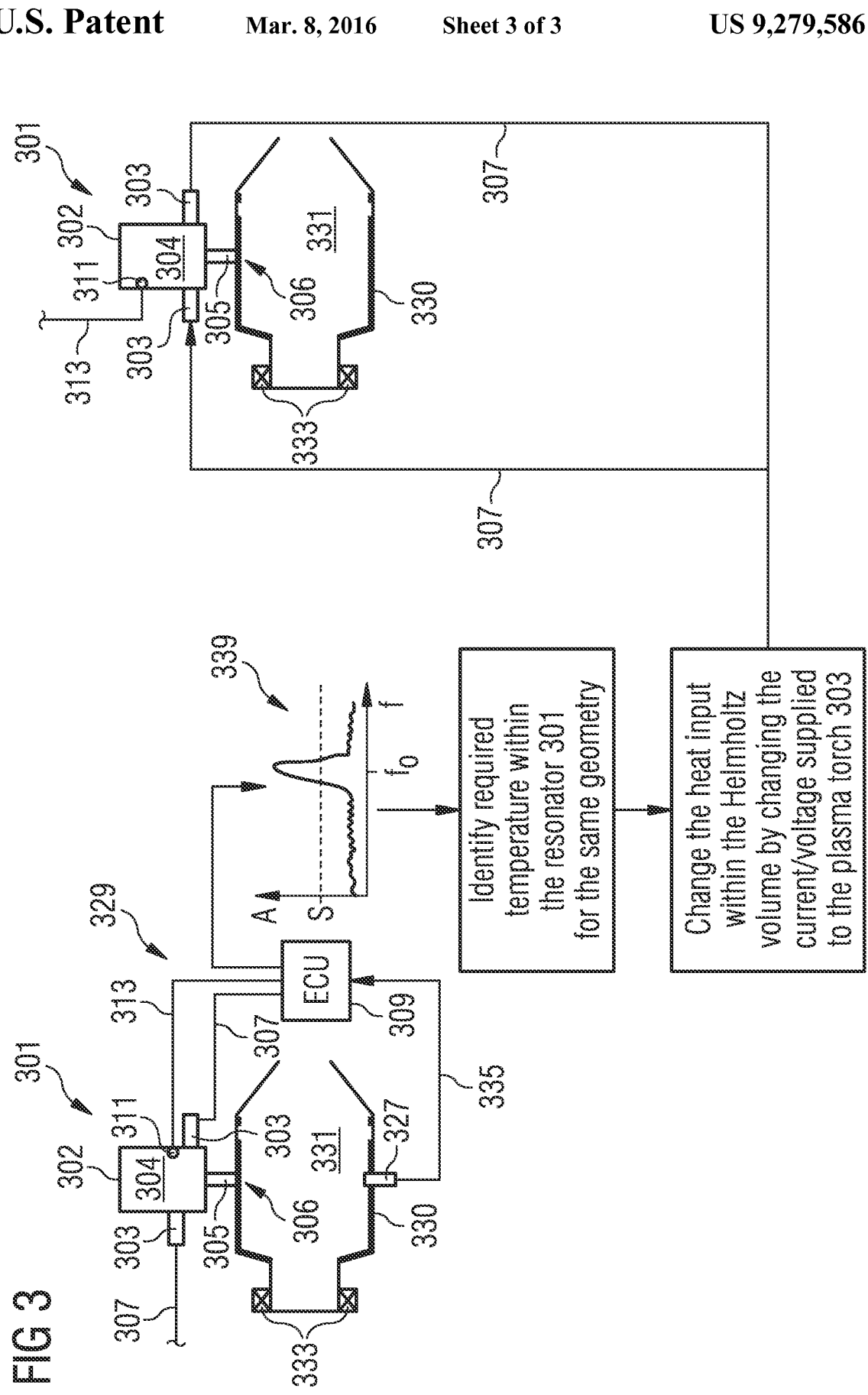

RESONATOR DEVICE FOR DAMPING THE PRESSURE OSCILLATION WITHIN A COMBUSTION CHAMBER AND A METHOD FOR OPERATING A COMBUSTION ARRANGEMENT

CROSS REFERENCE TO RELATED APPLICATIONS

This application is the US National Stage of International Application No. PCT/EP2011/053426 filed Mar. 8, 2011 and claims the benefit thereof. The International Application claims the benefits of European application No. 10159747.4 filed Apr. 13, 2010, both of the applications are incorporated by reference herein in their entirety.

FIELD OF THE INVENTION

The present invention relates to a resonator device for damping the pressure oscillation within a combustion chamber and to a method for operating a combustion arrangement. In particular, the present invention relates to a resonator device for damping a pressure oscillation within a combustion chamber which can be adjusted to damp an oscillation having a frequency which is changed upon changing the running condition of the combustion chamber. Further, the present invention relates to a method of operating a combustion arrangement involving damping of a pressure oscillation within the combustion chamber adjustable for different running conditions of the combustion chamber.

BACKGROUND OF THE INVENTION

In a combustion chamber, such as a combustion chamber of a gas turbine, a mixture of fuel and compressed air is burned. Thereby, the compressed air and the fuel is supplied to the combustion chamber and the combustion product is expelled from the combustion chamber resulting in a flow of material. Due to the supply of fuel and compressed gas and due to the exhaustion of the combustion product pressure oscillations evolve within the combustion chamber which may be characterized by a pressure oscillation frequency. The pressure oscillation frequency may in particular depend on a mass and/or flow velocity of the supplied fuel and supplied compressed air as well as on the mass and/or flow velocity of the expelled combustion product and may also depend on the geometry of the combustion chamber. Typical pressure oscillation frequencies may be in the range between 50 Hz and 1500 Hz, in particular around about 100 Hz.

These pressure oscillations adversely affect the operation of the combustion chamber, in particular the efficiency of the gas turbine comprising the combustion chamber. For damping the pressure oscillations within a combustion chamber it is known to attach a so-called Helmholtz resonator at the combustion chamber, such that an inside of the Helmholtz resonator is in communication with the combustion space defined by the combustion chamber.

From DE 10 2005 052 881 A1 a heating device including a combustion chamber is known, wherein the combustion chamber is connected to a flow channel which is coupled to a Helmholtz resonator for damping pressure oscillations. The temperature of the gas contained within the Helmholtz resonator may be changed to adapt a working frequency of the Helmholtz resonator to the oscillation within the combustion chamber.

EP 0 974 788 A1 discloses a Helmholtz resonator with a nozzle arrangement for generating a mixture of air and liquid before entry in a flow channel for damping oscillations within the flow channel.

GB 2,288,660 A discloses an apparatus for damping thermoacoustic vibrations in a combustion chamber of a gas turbine, wherein a Helmholtz resonator is connected to a combustion chamber for damping the combustion chamber oscillations. This document also discloses a control system which controls a heating element for heating the gas within the Helmholtz resonator based on a phase difference of two pressures measured within the combustion chamber and the Helmholtz resonator, respectively.

It has been observed that a combustion chamber may not work satisfactorily under changing running conditions. There may be a need for a resonator device which is suitable for damping a pressure oscillation within a combustion chamber which is in particular adaptable for different running conditions of the combustion chamber. In particular, there may be a need for a resonator device which is suitable for damping pressure oscillations of different frequencies which rapidly change in time and there may be a need for a method of operating a combustion arrangement at different running conditions.

SUMMARY OF THE INVENTION

This need may be met by the subject matter according to the independent claims. Advantageous embodiments of the present invention are described by the dependent claims.

According to an embodiment a resonator device for damping a pressure oscillation within a combustion chamber is provided, wherein the resonator device comprises a container filled with a gas; an opening in the container; and a heating element adapted to generate a flame, wherein the flame is arranged to heat the gas within the container.

The combustion chamber may in particular be a combustion chamber of a gas turbine. The resonator device may be connectable to the combustion chamber such that the opening in the container provides a communication between an inside of the combustion chamber and an inside of the container. Depending on the geometry of the container, the type of gas filled within the container, the temperature of the gas filled within the container, the pressure of the gas filled within the container, and/or the geometry of the opening in the container the resonator device may have a certain resonance frequency representing a frequency of pressure oscillations occurring within the resonator device at resonance.

In particular, the container may comprise a body portion and a neck portion connected to the body portion, wherein the neck portion provide a constriction and having the opening at a distal end of the neck with respect to the body portion. In particular, also the geometry, in particular an effective length of the neck and the volume of the body portion and the neck portion, and/or the cross-sectional area of the neck portion may affect the resonance frequency of the resonator device. In particular, the resonator device may function as a Helmholtz resonator for damping pressure oscillations.

The heating element may be connected to the container (either to the body portion or to the neck portion of the container) such that the flame generated by the heating element heats the gas within the container. The resonator device may comprise one or more heating elements arranged at different positions.

In particular, the flame generated by the heating element may be adapted, e.g. by utilizing a streaming material, to cause a convection of the gas filled within the container such that a temperature variation across different locations within the container rapidly balances to provide a homogeneous, or at least approximately homogeneous temperature distribution within the container. By providing the heating element adapted to generate a flame the temperature of the gas filled within the container may rapidly be changed thereby rapidly changing the resonance frequency of the resonator device. Thus, the resonator device is suitable for damping pressure oscillations within a combustion chamber under different running conditions. Thereby, the efficiency of the combustion chamber equipped with the resonator device may be improved. Further, it is not necessary to provide different resonator devices for different running conditions of the combustion chamber.

According to an embodiment the heating element is adapted to generate the flame using plasma assisted combustion. For an overview about plasma assisted combustion technology please see the paper "Plasma Assisted Combustion Technologies" by Matveev, S. Matveeva, E. Kirchuk, Proceedings of the European Combustion Meeting 2009 and the website http://www.plasmacombustion.com/iwepac.html. In a plasma assisted combustion a plasma is formed for example by application of a high electric field established between two electrodes which support burning of a fuel. Furthermore, the burning process may be confined or localized within a small volume by arranging for a gas flow, in particular a spiral-like gas flow, surrounding the core of the combustion process. The combustion process may also be confined or localized within a narrow flame provided at an outlet or at a nozzle of a plasma assisted combustion device. Plasma assisted combustion technologies are further characterized by a high heating power, high temperature of the flame and high velocity of the burning materials expelled from the plasma assisted combustion device. Due to the high heating power, high temperature of the flame and accurate controllability of the parameters of the flame the resonance frequency of the resonator device can rapidly be changed for damping pressure oscillations within a combustion chamber at different running conditions.

According to an embodiment the flame comprises a gas flow having a velocity of 25 m/s to 500 m/s, in particular 50 m/s to 300 m/s. Due to the high velocity of the glowing and burning materials constituting the flame the heat energy comprised within the flame is rapidly distributed throughout the container of the resonator device by convection. Thereby, the resonance frequency of the resonator device may be rapidly changed to suit different running conditions of the combustion chamber.

According to an embodiment the heating element provides a heating power of 0.01 kW to 3 kW, in particular of 0.1 kW to 3 kW, in particular of 1 kW to 3 kW. Due to this high heating power of the heating element the gas within the container rapidly changes its temperature when heated by the heating element. Thereby, the resonator device is in particular suitable to result in a large temperature change of the gas within the container which in turn results in a large change of the speed of sound of the gas within the container which in turn results in a large change of the resonance frequency of the resonator device.

According to an embodiment the flame has a temperature of 500° C. to 3,000° C. The flame temperature is understood to define a temperature of material within a volume region defined by light emitting material of the flame undergoing chemical reactions. Thereby, the resonator device is suitable for damping pressure oscillations having a large frequency range.

According to an embodiment the heating element comprises a reverse vortex plasma generator. A reverse vortex plasma generator may in particular comprise a cylindrical container within which a so-called reverse vortex flow (i.e. a spiral-like flow in a direction reverse to an axial flow direction of a fuel air mixture) of a first gas (for example air) is generated. Further, a second gas (for example air and fuel) may be introduced from one end of the cylindrical container along an axial direction (for example along the symmetry axis of the container) which may thus be confined or localized close to the symmetry axis of the container. Both the first gas and the second gas may be ionized and the second gas may ignite spontaneously (or by application of an electric field) along its passage through the cylinder resulting in a flame at an outlet of the cylinder. In particular, the flame may be comprised of glowing or burning (chemically reacting) material having a velocity between 50 m/s to 300 m/s.

According to an embodiment the heating element is adapted to generate a plasma torch.

According to an embodiment, an embodiment of a resonator device is comprised in a combustion arrangement which further comprises a combustion chamber for defining a combustion space for burning fuel, wherein the container of the resonator device is connected to the combustion chamber such that an inside of the container is in communication with the combustion space via the opening of the resonator device, wherein in particular the resonator device has a resonance frequency equal to a pressure oscillation frequency within the combustion chamber under normal load conditions. In particular, the resonance frequency may be at least approximately equal (i.e. at least to an accuracy of 10%, in particular to an accuracy of 5% equal) to a pressure oscillation frequency within the combustion chamber under normal load conditions. Thereby, the resonance frequency of the resonator device may be defined as the resonance frequency, when the gas filled within the container of the resonator device has ambient temperature, in particular a temperature of 50° C.-15° C., in particular a temperature of 20° C.

With "normal load conditions" a mode of operation is understood, which is not during startup or shutdown of a gas turbine. Particularly the combustion chamber may be operated with a substantially unmodified supply of fuel and has a substantially unchanged temperature over time. "Normal load conditions" may define a mode of operation at which the combustion chamber has the highest efficiency. "Normal load conditions" may be considered a steady state of the combustion chamber and of the gas turbine, during which only minor control actions will be necessary.

The combustion space may be acoustically coupled to the inside of the container of the resonator device via the opening such that a pressure oscillation occurring within the combustion chamber due to the combustion process or due to the supply or flow of air and fuel or due to the flow of the exhausted combustion product may be transmitted to the opening to cause excitation of oscillations of the air filled within the container of the resonator device. There may be a phase-shift between the oscillations within the combustion chamber and the oscillations within the container of the resonator device such that the oscillations within the combustion chamber are damped, in particular by destructive interference with the oscillations within the container of the resonator device. Due to the heating capability of the resonator device its resonance frequency may rapidly be changed to also damp pressure oscillations within the combustion chamber occurring at conditions other than the normal load conditions. Thereby, the combustion chamber may be used under a broad range of running conditions or load conditions without requiring more than one resonator device.

According to an embodiment the combustion arrangement further comprises a pressure measuring probe to measure a pressure oscillation within the combustion space; a temperature measuring probe to measure a temperature of the gas within the container; and a control system adapted for controlling the heating element based on the measured pressure oscillation within the combustion space and the measured temperature within the inside of the container.

The pressure measuring probe may be any sensor for sensing a pressure oscillation. In particular one or more pressure measuring probe(s) may be arranged at one or more locations within the combustion space. The opening of the resonator device, in particular arranged at a distal end of the neck portion of the resonator device, may be arranged and connected to the combustion chamber at a location where the highest pressure oscillations within the combustion chamber occur. Thereby, an efficiency of the damping function of the resonator device may be optimized. Further, or alternatively the optimal location of the resonator device, in particular the optimal location of the opening of the resonator device providing the communication between the container of the resonator device and the combustion chamber may be derived by computer simulations of the entire combustion arrangement, the combustion chamber or by experimental tests.

The temperature measuring probe may be any sensor for measuring a temperature. One or more temperature measuring probes may be arranged at one or more locations within the container enabling to measure a temperature distribution across the container.

The control system may be connected to the one or more pressure measuring probes, to the one or more temperature measuring probes and to the heating element to read measuring values and to send control signals to the heating element to adjust a heating power, a temperature of the flame of the heating element and/or other parameters of the heating element. The control system may comprise a processing module for processing measured values and in particular for deriving the frequency of the pressure oscillations within the combustion space. Further, the control system may comprise program code within the processing module to derive a temperature of the gas within the container for which the resonator device has a particular resonance frequency in particular the frequency of the pressure oscillations within the combustion space measured using the one or more pressure measuring probes. The control system may further comprise a storage module for storing system parameters and program code.

According to an embodiment the control system is adapted to control the heating element to change the temperature of the gas within the container, when the combustion chamber is operated in a condition different from the normal load condition such that a frequency of the pressure oscillation within the combustion space is equal (in particular at least approximately equal, in particular at least within an accuracy of 10%, in particular within an accuracy of 5% equal) to a resonance frequency of the container filled with the gas changed upon changing the temperature of the gas within the container. Thereby, the pressure oscillations within the combustion chamber may effectively be damped by the resonator device even for different load conditions of the combustion chamber. Thereby, the combustion chamber may be operated under different running conditions in an optimized way.

According to an embodiment a method of operating a combustion arrangement is provided, wherein the method comprises: burning a fuel in a combustion space defined by a combustion chamber; generating a pressure oscillation within the combustion chamber, in particular by the burned fuel; generating a flame using a heating element to heat a gas within a container connected to the combustion chamber, an inside of the container being in communication with the combustion chamber via an opening in the container; and damping the pressure oscillation within the combustion chamber. The pressure oscillation within the combustion chamber may alternatively or additionally be generated by a flow of fuel and/or air supplied to the combustion chamber. The damping of the pressure oscillation within the combustion chamber may be due to the acoustic coupling between the combustion space and the inside of the container of the resonator device. Thereby, the frequency of the pressure oscillation within the combustion chamber may at least approximately match the resonance frequency of the resonator device formed by the container and the opening in the container, wherein this resonance frequency of the resonator device may depend on the temperature of the gas within the container.

According to an embodiment the method of operating a combustion arrangement further comprises measuring a pressure oscillation within the combustion space using a pressure measuring probe; measuring a temperature of the gas within the container using a temperature measuring probe; and controlling the heating element based on the measured pressure oscillation and the measured temperature using a control system. Thereby, in particular the heating element may be controlled such that the resonance frequency of the resonator device at least approximately matches the frequency of pressure oscillations within the combustion space.

According to an embodiment the method of operating a combustion arrangement further comprises controlling the heating element to change the temperature of the gas within the container, when the combustion chamber is operated in a condition different from the normal load condition such that a frequency (changed compared to the frequency under normal load condition) of the pressure oscillation within the combustion space is equal (in particular at least approximately equal, in particular at least within an accuracy of 10%, in particular 5% equal) to a resonance frequency of the container changed upon changing the temperature of the gas within the container. Thereby, the pressure oscillation within the combustion chamber may effectively be damped by the resonator device even under changing load conditions of the combustion chamber.

According to an embodiment the method of operating a combustion arrangement further comprises increasing the temperature of the gas within the container at a rate of at least 50° C. per second. By changing the temperature of the gas within the container at this high rate a resonance frequency of the resonator device can rapidly be changed allowing consequently rapid load changes of the combustion chamber upon continuous damping of pressure oscillations within the combustion chamber.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings.

FIG. 2 schematically illustrates a reverse vortex plasma generator which can be used as a heating element in a resonator device illustrated in FIG. 1 according to an embodiment.

FIG. 3 schematically illustrates a combustion arrangement according to an embodiment and a method of operating a combustion arrangement according to an embodiment.

DETAILED DESCRIPTION OF THE INVENTION

Figure 1:
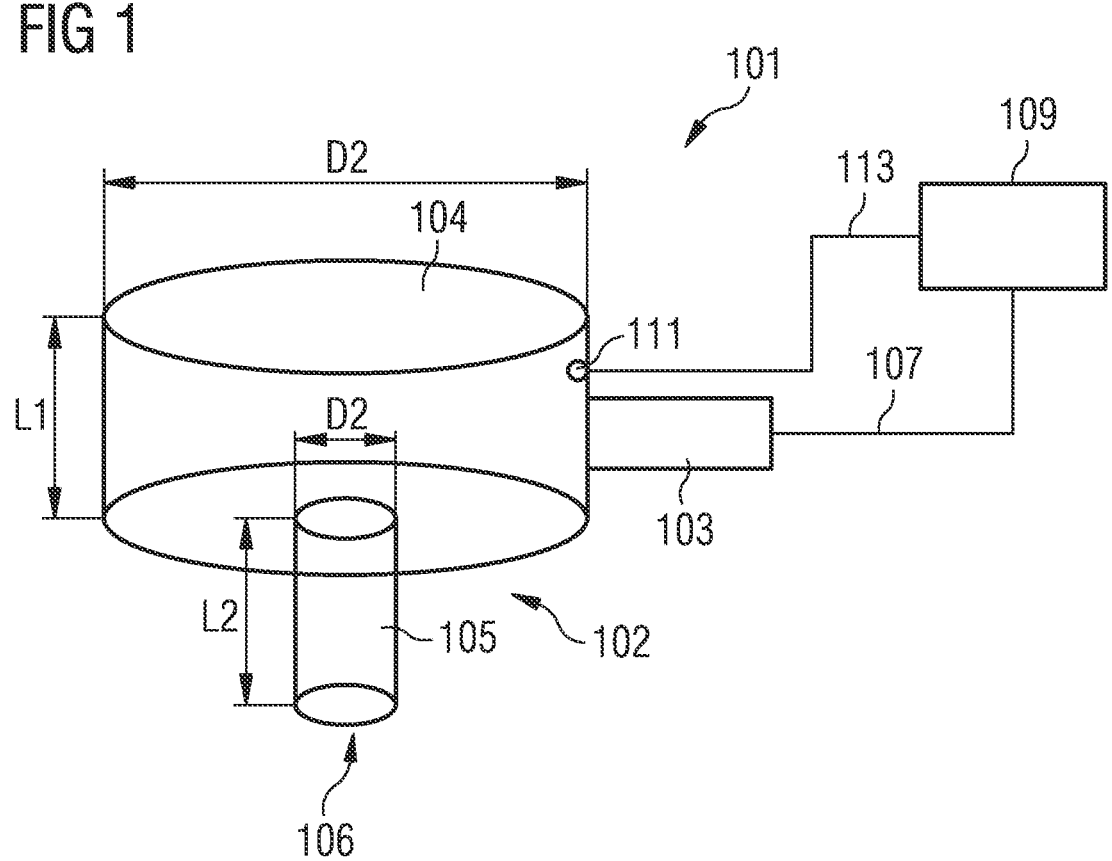
FIG. 1 schematically illustrates a resonator device according to an embodiment.

The illustration in the drawing is schematically. It is noted that in different figures, similar or identical elements are provided with the same reference signs or with reference signs, which are different from the corresponding reference signs only within the first digit.

FIG. 1 schematically shows a resonator device 101 for damping a pressure oscillation within a combustion chamber. The resonator device 101 comprises a container 102 which is filled with a gas, such as air, and comprises a heating element 103 which is adapted as a reverse vortex plasma generator. The container 102 of the resonator device comprises a body portion 104 and a neck portion 105. The body portion 104 comprises a cylindrical container which is in communication with the neck portion 105 which also has a cylindrical shape but having a much smaller diameter D2 compared to the diameter D1 of the body portion 4 of the resonator device 101. The body portion has a length L1 and the neck portion has a length L2.

At a distal end of the neck portion 105 the resonator device 101 has an opening 106 via which the resonator device 1 may be in communication with a combustion space of a combustion chamber for damping a pressure oscillation within the combustion chamber.

The geometry of the resonator device 101 governs the resonance frequency f of the resonator device according to the following formula:

$$f = \frac{c}{2\pi}\sqrt{\frac{S}{l'V}}$$

with the following nomenclature:
S—the cross sectional area of the neck of the resonator
V—resonator's volume
l'—the effective length of resonator's neck, which is based on the geometric neck length L2
c—the speed of sound The frequency of the resonator device may be for example 100 Hz, when the gas filled within the container 102 has a temperature of 20° C. Changing the temperature of the gas filled within the container 102 changes via the changed speed of sound c the resonance frequency f of the resonator device.

In order to change the temperature of the gas filled within the container 102 the reverse vortex plasma generator 103 is attached to an outer wall of the body portion 104 of the resonator device 101 such that a flame generated by the reverse vortex plasma generator 103 protrudes into the inside of the container 102 to heat the gas filled within the container 102. Thereby, the heating element 103 is controlled via a control line 107 which is connected to a control system 109. The resonator device 101 is also equipped with a temperature measuring probe 111 for measuring the temperature of the gas filled within the container 102. A signal representing the measured temperature is fed via a control line 113 to the control system 109.

On demand the control system 109 is adapted to adjust a resonance frequency f of the resonator device 101 by adjusting the temperature of the gas within the container 102 by activating the heating element 103 until the temperature of the gas filled within the container 102 measured via the temperature measuring probe 111 equals the temperature corresponding to the desired resonance frequency of the resonator device 101.

In other embodiments one or more additional heating elements may be attached to the resonator device at the body portion 104 or at the neck portion 105 for heating the gas filled within the container 102. In other embodiments one or more additional temperature measuring probes may be arranged within different locations of the inside of the container 2 for measuring the temperature of the filled gas.

FIG. 2 schematically shows principles of a reverse vortex plasma generator 203 that may be used as a heating element 103 in the resonator device 101 illustrated in FIG. 1. The reverse vortex plasma generator 203 illustrated in FIGS. 2A and 2B comprises a substantially cylindrical container 215 which comprises a number of nozzles 217 arranged at one end of the cylinder 215 surrounding the cylindrical container 215 circumferentially. Using the nozzles 217 a first gas, such as air, is introduced along direction 216 into the cylindrical container 215 to perform a spiral like movement indicated as a spiral like line 219 within the container 215.

At the base of the cylindrical container 215 opposite to the end harbouring the nozzles 217 a second gas is introduced along an axial direction 221. The first gas entering along direction 216 as well as the second gas introduced along direction 221 are ionized and the second gas in particular comprises air and fuel. During its passage through the cylindrical container 215 the second air ignites, wherein the combustion process is confined within a small volume around the symmetry axis 223 of the cylindrical container 215. A flame of the burned first gas exits the cylindrical container 215 through an opening 225 along the direction 227 being substantially parallel to the symmetry axis 223. Thus the burned first gas is injected into the body portion 104 (not shown in FIG. 2) of the resonator device.

As is illustrated in FIG. 2B the first gas introduced along direction 216 via the nozzles 217 flows in a radially outer portion of the cylindrical container 215 in a direction opposite to the direction 221 of the first gas but reverses its propagation direction at a particular radial position closer to the symmetry axis 223 such that for radial positions closer to the symmetry axis 223 than this particular radial position the first gas propagates in substantially in the same direction as the second gas. Thereby, an effective thermal insulation of the combustion process confined and localized within a small volume around the symmetry axis 223 from the wall of the container 215 is achieved such that the reverse vortex plasma generator 203 may even be hold by hand while in operation.

Instead of using the reverse vortex plasma generator 203 also a plasma torch or other plasma assisted combustion devices may be used as a heating element 103 in the resonator device 101 illustrated in FIG. 1.

FIG. 3 schematically illustrates a combustion arrangement 329 and a method of operating a combustion arrangement 329 according to an embodiment. The combustion arrangement 329 comprises a combustion chamber 330 defining a combustion space 331 within which a fuel may be burned. Via the nozzles 333 fuel as well as compressed air is supplied into the combustion space 331.

Upon supply of the fuel and the compressed air as well as upon burning the fuel and the compressed air pressure oscillations are generated within the combustion space 331 which adversely effect the operation of the combustion arrangement 329. Typically these pressure oscillations are not generated intentionally but they may occur due to different reasons. To damp these pressure oscillations the combustion arrangement 329 comprises a resonator device 301 comprising a container 302 formed by a container body 304 and a container neck portion 305. Via an opening at the distal end of the neck portion 305 the inside of the container 302 is in communication with the combustion space 331.

The control system 309 is connected via a data line 335 to a pressure measuring probe 327 which measures the pressure within the combustion space 331. The control system 309 is further adapted to derive the frequency of the pressure oscillations measured via the pressure measuring probe 327 as is indicated in the diagram 339, which shows an amplitude A of pressure oscillation frequencies occurring within the combustion chamber 331 in dependence of their frequency f. Oscillations of frequency $f_0$ have amplitudes above a threshold S as indicated in diagram 339. The control system 309 is adapted to identify a temperature within the resonator device 301 such that the resonator device 301 has as a resonance frequency equal to an undesired frequency of the pressure oscillations measured within the combustion space 331 which is $f_0$. After having identified the target temperature of the resonator device 301 the control system 309 controls two heating elements 303 attached to the resonator device 301 to heat the gas filled within the container 302 to adjust its resonance frequency to the frequency $f_0$. Having heated the gas filled within the container 302 of the resonator device 301 the resonator device 301 has changed its resonance frequency to be $f_0$. Since the resonator device 301 is in communication with the combustion space 331 via the opening 306 the resonator device damps the pressure oscillations at frequency $f_0$ occurring within the combustion space 331. The temperature within the resonator device 310 is measured via the temperature measuring probe 311 and a corresponding signal is transmitted to the control system 309 which may be used for feedback regulation.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

A resonator device for damping a pressure oscillation within a combustion chamber comprises a container filled with a gas; an opening in the container; and a heating element adapted to generate a flame, wherein the flame is arranged to heat the gas within the container.

The invention claimed is:

1. An apparatus comprising:
   a resonator device for damping a pressure oscillation within a combustion chamber, comprising:
      a container;
      an opening in the container in fluid communication with the combustion chamber; and
      a heating element that generates a flame that heats a gas within the container and changes a temperature inside the container operable to change a resonance frequency of the container to correspond to a pressure oscillation frequency within the combustion chamber to dampen the pressure oscillation within the combustion chamber.

2. The apparatus according to claim 1, further comprising:
   the combustion chamber that defines a combustion space for a burning fuel;
   wherein the container is connected to the combustion chamber such that an inside of the container is in fluid communication with the combustion space via the opening,
   a control system configured to control the heating device so as to cause the resonator device to have a resonance frequency corresponding sufficiently to a pressure oscillation frequency within the combustion chamber under a normal load condition to dampen the pressure oscillation within the combustion chamber.

3. The apparatus according to claim 2, wherein the heating element is adapted to generate the flame using plasma assisted combustion.

4. The apparatus according to claim 2, wherein the heating element is adapted such that the generated flame comprises a gas flow having a velocity of 25 meters/second (m/s) to 500 m/s.

5. The apparatus according to claim 4, wherein the heating element is adapted such that the generated flame comprises a gas flow having a velocity in a range of 50 m/s to 300 m/s.

6. The apparatus according to claim 2, wherein the heating element is adapted to provide a heating power of 0.01 kilowatts (kW) to 3 kW.

7. The apparatus according to claim 2, wherein the heating element is adapted to generate the flame with a temperature of 500 degrees Celsius (° C.) to 3,000° C.

8. The apparatus according to claim 2, wherein the heating element comprises a reverse vortex plasma generator.

9. The apparatus according to claim 2, wherein the heating element is adapted to generate a plasma torch.

10. The combustion arrangement according to claim 2, further comprising:
    a pressure measuring probe to measure a pressure oscillation within the combustion space;
    a temperature measuring probe to measure a temperature of the gas within the container; and
    wherein the control system is configured to control the heating element based on the measured pressure oscillation within the combustion space and the measured temperature within the inside of the container.

11. The combustion arrangement according to claim 10, wherein the control system is configured to control the heating element to change the temperature of the gas within the container to change resonance frequency of the container filled with the gas having the changed temperature so as to corresponds sufficiently to a different frequency of the pressure oscillation within the combustion space in order to dampen the pressure oscillation within the combustion chamber when the combustion chamber is operated in a condition different from the normal load condition.

12. A method for operating a combustion arrangement, comprising:
    burning a fuel in a combustion space defined by a combustion chamber;

generating a pressure oscillation within the combustion chamber by the burned fuel;

generating a flame using a heating element to heat a gas within a container connected to the combustion chamber, wherein an inside of the container is in communication with the combustion chamber via an opening in the container; and damping the pressure oscillation within the combustion chamber.

13. The method according to claim 12, further comprising:

measuring the pressure oscillation within the combustion space using a pressure measuring probe;

measuring a temperature of the gas within the container using a temperature measuring probe; and controlling the heating element based on the measured pressure oscillation and the measured temperature using a control system.

14. The method according to claim 13, further comprising controlling the heating element to change the temperature of the gas within the container when the combustion chamber is operated in a condition different from a normal load condition such that a frequency of the pressure oscillation within the combustion space is equal to a resonance frequency of the container filled with the gas having the changed temperature.

15. The method according to claim 14, further comprising increasing the temperature of the gas within the container at a rate of at least 50 degrees Celsius (° C.) per second.

* * * * *